United States Patent
Miryala et al.

(10) Patent No.: US 9,480,015 B2
(45) Date of Patent: Oct. 25, 2016

(54) BALANCING QUALITY OF SERVICE AND POWER SAVING IN A DIRECT COMMUNICATION LINK ENVIRONMENT

(71) Applicant: QUALCOMM Incorporated, San Diego, CA (US)

(72) Inventors: Sriman Miryala, Hyderabad (IN); Ashwani Kumar Dwivedi, Hyderabad (IN); Pradeep Kumar Yenganti, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 13/940,983

(22) Filed: Jul. 12, 2013

(65) Prior Publication Data

US 2015/0016321 A1    Jan. 15, 2015

(51) Int. Cl.
*H04W 52/02* (2009.01)

(52) U.S. Cl.
CPC ........... *H04W 52/0209* (2013.01); *Y02B 60/50* (2013.01)

(58) Field of Classification Search
CPC ................... H04W 52/0209; H04W 52/0216; H04W 52/0235; H04W 52/0251
See application file for complete search history.

(56) References Cited

U.S. PATENT DOCUMENTS

| | | | |
|---|---|---|---|
| 8,203,985 B2 | 6/2012 | Gong et al. | |
| 8,259,632 B2 | 9/2012 | Seok et al. | |
| 2008/0219228 A1* | 9/2008 | Seok et al. | 370/338 |
| 2009/0097438 A1 | 4/2009 | Kneckt et al. | |
| 2009/0196211 A1* | 8/2009 | Wentink | 370/311 |
| 2011/0188429 A1* | 8/2011 | Seok | 370/311 |
| 2012/0051240 A1 | 3/2012 | Dwivedi | |
| 2012/0057577 A1* | 3/2012 | Dwivedi | H04W 76/023 370/338 |

OTHER PUBLICATIONS

Majkowski, J. and Kneckt, J., Peer Traffic Indication Enhancements, IEEE 802.11-08/0853r0, pp. 1-11, Jul. 15, 2008.*

\* cited by examiner

*Primary Examiner* — Benjamin Lamont
(74) *Attorney, Agent, or Firm* — DeLizio Law, PLLC

(57) ABSTRACT

A first network device in communication with a second network device via a wireless communication link provides an indication to the second network device that the first network device will enter a power save mode. While operating in the power save mode, the first network device periodically transmits a trigger frame to the second network device to determine whether the second network device comprises buffered frames for the first network device. The first network device receives the buffered frames from the second network device responsive to transmitting the trigger frame. In another example, if both the first and the second network devices operate in the power save mode, the first network device receives a notification of available buffered frames from the second network device. The first network device transmits buffered frames destined for the second network device prior to transmitting a response to the received notification.

29 Claims, 9 Drawing Sheets

BALANCING QUALITY OF SERVICE AND POWER SAVING IN A DIRECT COMMUNICATION LINK ENVIRONMENT

BACKGROUND

Embodiments of the inventive subject matter generally relate to the field of communication networks and, more particularly, to improving performance in a direct wireless communication link environment.

In a wireless communication network governed by an access point, client devices typically communicate with each other via the access point. In other words, a transmitting client device may transmit a frame to the access point and the access point in turn, may forward the received frame to a destination client device. Tunneled Direct Link Setup (TDLS) is a communication protocol that can enable a client device to automatically create a secure, direct wireless communication link with another client device, which can preclude the need for the client device to always transmit data through the access point.

SUMMARY

Various embodiments for improving performance in a direct wireless communication link environment are disclosed. In one embodiment, a direct wireless communication link is established between a first network device and a second network device of a communication network. The first network device can provide an indication to the second network device that the first network device will enter a power save operating mode. While the first network device is in the power save operating mode, a trigger frame can be periodically transmitted from the first network device to the second network device to determine whether a frame intended for the first network device is buffered at the second network device. The first network device can receive the buffered frame from the second network device in response to transmitting the trigger frame to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
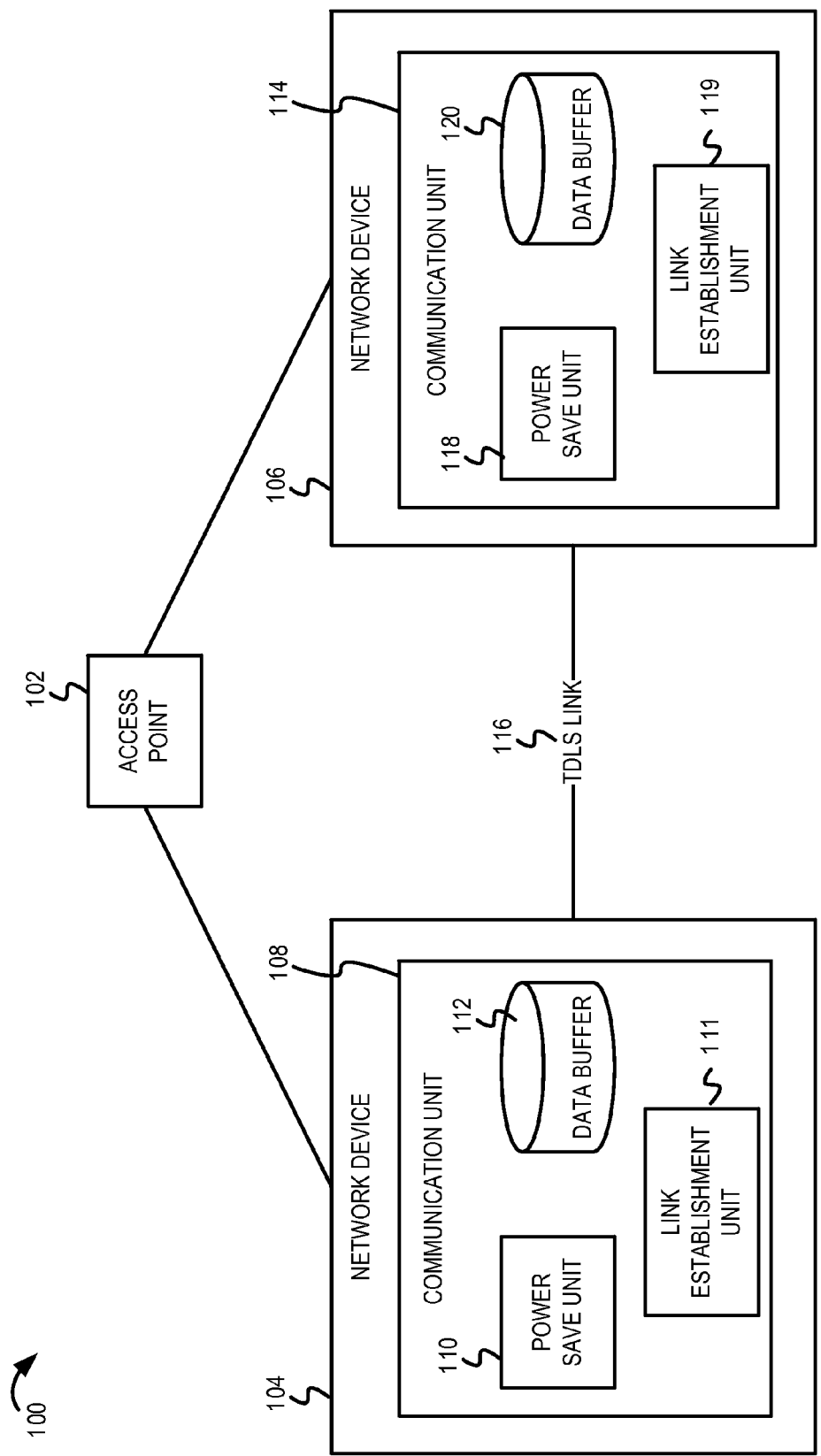
FIG. 1 is an example conceptual diagram including a mechanism for improving performance in a direct wireless communication link environment.

The description that follows includes exemplary systems, methods, techniques, instruction sequences, and computer program products that embody techniques of the present inventive subject matter. However, it is understood that the described embodiments may be practiced without these specific details. For instance, although examples refer to improving performance in a wireless local area network (WLAN), embodiments are not so limited. In other embodiments, network devices that implement other suitable protocols and standards (e.g., WiMAX, Multimedia over Coax Alliance (MoCA®), etc.) can execute the operations described herein. Furthermore, although embodiments describe improving performance in a Tunneled Direct Link Setup (TDLS) environment, embodiments are not so limited. In other embodiments, the operations described herein can be implemented in environments that utilize other suitable communication protocols and applications (e.g., other direct connect protocols and/or other environments having a shared communication medium). In other instances, well-known instruction instances, protocols, structures, and techniques have not been shown in detail in order not to obfuscate the description.

The TDLS communication protocol enables a network device to establish a secure, direct wireless communication link ("TDLS link") with another network device. The network devices that establish the TDLS link are each herein referred to as a "TDLS device." TDLS unscheduled automatic power save delivery (UAPSD) is a power save mechanism, whereby one or both the TDLS devices may enter into a power save operating mode. The TDLS device in the power save operating mode may also be referred to as "sleep network device" while the TDLS device that buffers frames destined for the sleep network device may be referred to as "buffer network device." Periodically, the buffer network device can transmit a peer traffic indicator (PTI) frame to the sleep network device via the access point. The PTI frame can indicate that the buffer network device comprises buffered frames destined for the sleep network device. After the sleep network device receives the PTI frame from the buffer network device via the access point, the sleep network device can transmit a peer traffic response (PTR) frame to the buffer network device. In response to receiving the PTR frame, the buffer network device can transmit the buffered frames to the sleep network device. However, in current implementations, the sleep network device waits to receive the PTI frame from the buffer network device and does not receive any buffered frames until the PTI/PTR frames are successfully exchanged. Also, the buffer network device generates the PTI frame every predetermined time interval; and the access point relays the PTI frame to the sleep network device every predetermined beacon interval. This can cause a delay in providing data (e.g., especially for time-sensitive or high quality-of-service (QoS) data) that is buffered after the sleep network device switches to the power save operating mode and before the next PTI frame is generated and transmitted via the access point. Furthermore, when both the TDLS devices switch to the power save operating mode, each of the TDLS devices can operate as both a sleep network device and a buffer network device. In this scenario, each of the TDLS devices can initiate the PTI/PTR frame exchange to provide buffered frames to the other TDLS device. For example, a first TDLS device may transmit a PTI frame to the second TDLS device (via the access point), receive the PTR frame from the second TDLS device, and then provide buffered frames to the second TDLS device. Similarly, the second TDLS device can transmit a PTI frame to the first TDLS device (via the access point), receive the PTR frame from the first TDLS device, and then provide the buffered frames to the first TDLS device. Because each of the TDLS devices is configured to provide/receive buffered frames only after exchanging the PTI/PTR frames, this can result in an overhead increase, performance degradation, and traffic delivery delay.

In some embodiments, a TDLS device can be configured to deliver/receive buffered frames without exchanging PTI/PTR frames with another TDLS device. In some embodiments, one of the TDLS devices may be a sleep network device, while the other TDLS device may be a buffer network device. In other words, only one of the TDLS devices can switch to the power save operating mode; while the other TDLS device can remain in the active operating mode. In this embodiment, instead of waiting to receive the PTI frame from the buffer network device, the sleep network device can be configured to periodically transmit a trigger frame to the buffer network device to query the buffer network device for buffered frames destined for the sleep network device, as will be described below in FIGS. 2-5. In another embodiment, each of the TDLS devices may operate as both a sleep network device and a buffer network device. In other words, both the TDLS devices can switch to the power save operating mode. In this embodiment, a first TDLS device may receive a PTI frame from a second TDLS device indicating availability of buffered frames destined for the first TDLS device. This first TDLS device can be configured to interpret the received PTI frame as a trigger frame from the second TDLS device requesting buffered frames destined for the second TDLS device. Accordingly, the first TDLS device can transmit the buffered frames destined for the second TDLS device before transmitting a response to the received PTI frame (for receiving the buffered frames destined for the first TDLS device), as will be described below in FIGS. 6-9. Such a mechanism for requesting/receiving buffered frames without the exchange of peer traffic indicator/response frames can minimize transmission overhead, minimize delay in traffic delivery, and improve performance of the TDLS link.

FIG. 1 is an example conceptual diagram including a mechanism for improving performance in a direct wireless communication link environment. FIG. 1 depicts a communication network 100 comprising an access point 102 and network devices 104 and 106. The network device 104 comprises a communication unit 108. The communication unit 108 comprises a power save unit 110, a link establishment unit 111, and a data buffer 112. Likewise, the network device 106 also comprises a communication unit 114. The communication unit 114 comprises a power save unit 118, a link establishment unit 119, and a data buffer 120. Although not depicted in FIG. 1, the access point 102 may also comprise a communication unit configured to execute operations for governing the communication network 100. In some embodiments, the access point 102 and the network devices 104 and 106 can each be standalone WLAN devices configured to implement WLAN communication protocols. In other embodiments, at least one of the access point 102 and the network devices 104 and 106 can be IEEE Std. 1905.1 compatible devices (also referred to as "hybrid" devices). The hybrid devices can each comprise multiple network interfaces that utilize a plurality of communication protocols to couple the hybrid device to a plurality of communication network segments of the communication network 100. For example, in some embodiments, in addition to WLAN communication protocols (e.g., IEEE 802.11 communication protocols), the access point 102, the network device 104, and/or the network device 106 can implement other protocols and functionality to enable other types of communications (e.g., Bluetooth®, Ethernet, WiMAX, powerline communications, etc.). In some embodiments, the access point 102 and the network devices 104 and 106 can each be electronic devices, such as a laptop computer, a tablet computer, a mobile phone, a smart appliance, a gaming console, a desktop computer, or other suitable electronic devices configured to implement communication protocols. In some embodiments, the communication units of the access point 102 and the network devices 104 and 106 can each be implemented on a system-on-a-chip (SoC), an application specific integrated circuit (ASIC), or another suitable integrated circuit to enable communications on their respective network device. In some embodiments, the communication units may each comprise one or more processors and memory, and may each be implemented in one or more integrated circuits on one or more circuit boards of their respective network device.

In the example of FIG. 1, the network devices 104 and 106 are associated with and connected to the access point 102. In addition, the network devices 104 and 106 can also establish a direct wireless communication link 116 to directly communicate with each other. For example, the link establishment unit 111 of the network device 104 and the link establishment unit 119 of the network device 106 can each execute the tunneled direct link setup (TDLS) protocol to establish a TDLS link 116 between the network devices 104 and 106. The TDLS protocol can use a specific Ether type encapsulation to tunnel direct link setup frames through the access point 102, in order to establish the TDLS link 116 between the network devices 104 and 106. The network devices 104 and 106 that establish the TDLS link 116 may each be referred to as a "TDLS device."

In some embodiments, one of the TDLS devices that form the TDLS link 116 may switch to a power save operating mode, while the other TDLS device may remain in an active operating mode. The TDLS device (e.g., the network device 104) that switches to the power save operating mode is herein referred to as a "sleep network device." The TDLS device (e.g., the network device 106) that buffer frames destined for the sleep network device is herein referred to as a "buffer network device." The buffer network device 106 can periodically transmit the buffered frames to the sleep network device 104. It is noted that in some embodiments, the power save operating mode can be further divided into awake sub-intervals and sleep sub-intervals. During the sleep sub-interval, the sleep network device 104 can operate in a low power or inactive state. The sleep network device 104 may not transmit or receive any frames during the sleep sub-interval. In some embodiments, the sleep network device 104 may power down (or disable) some/all of its processing components. During the awake sub-interval, the sleep network device 104 can temporarily operate in a high power (or normal) operating state. The sleep network device 104 can transmit and/or receive frames during the awake sub-interval. After transmitting and receiving the available frames, the sleep network device 104 can switch back to the sleep sub-interval of the power save operating mode. It is further noted that if the buffer network device 106 is configured to operate in the active operating mode, the buffer network device 106 may consistently remain in the normal (or high power) operating state and may not switch to an inactive (or low power) operating state.

As indicated above, in some embodiments, one of the TDLS devices (e.g., the network device 104) may switch to the power save operating mode and may operate as the sleep network device 104. The other TDLS device (e.g., the network device 106) may remain in the active operating mode and may operate as the buffer network device 106. In this embodiment, the power save unit 110 of the sleep network device 104 can be configured to request buffered frames from the buffer network device 106 without waiting to receive a peer traffic indicator (PTI) frame from the buffer network device 106, as will be further described with reference to FIGS. 2-5. The time interval between the transmission of a last buffered frame (transmitted during a service period associated with a preceding PTI frame) and the transmission of the next PTI frame is herein referred to as a "PTI window interval." During the PTI window interval, the sleep network device 104 (e.g., the power save unit 110) can periodically transmit a trigger frame to query the buffer network device 106 regarding the availability of buffered frames destined for the sleep network device 104. Thus, the sleep network device 104 need not passively wait (during the PTI window interval) to receive the next set of buffered frames from the buffer network device 106. Configuring the sleep network device 104 to periodically transmit the trigger frame to the buffer network device 106 can also enable the sleep network device 104 to effectively fetch the buffered frames from the buffer network device 106 at regular intervals and to achieve the requisite quality of service (QoS).

In some embodiments, both of the TDLS devices that form the TDLS link 116 can switch to the power save operating mode. With reference to the example of FIG. 1, the network devices 104 and 106 can each operate as both a sleep network device and a buffer network device. Specifically, the network device 104 can switch to the power save operating mode and can buffer frames destined for the network device 106; while the network device 106 can (simultaneously) switch to the power save operating mode and can buffer frames destined for the network device 104. In this embodiment, the power save unit 110 of the network device 104 can be configured to receive buffered frames from the network device 106 without waiting for a PTI frame from the network device 106. Likewise, the power save unit 118 of the network device 106 can be configured to receive buffered frames from the network device 104 without waiting for a PTI frame from the network device 104. As will be further described with reference to FIGS. 6-8, when one sleep network device (e.g., the network device 104) receives a PTI frame from the corresponding buffer network device (e.g., the network device 106), the sleep network device 104 can interpret the received PTI frame as a request to transmit buffered frames (if available) destined for the buffer network device 106. The sleep network device 104 can transmit a PTR frame to the buffer network device 106 only after transmitting all the buffered frames intended for the buffer network device 106.

Figure 2:
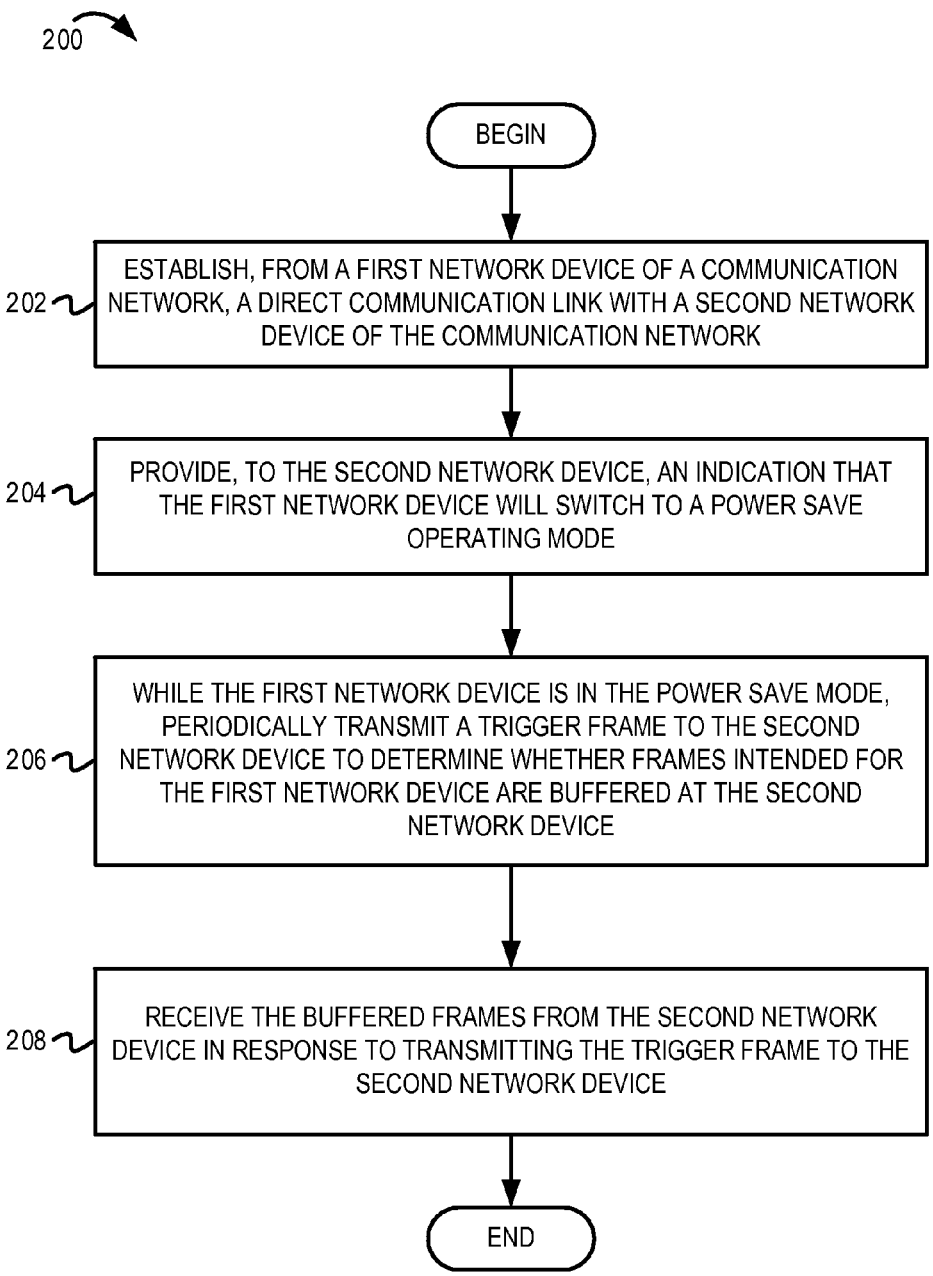
FIG. 2 is a flow diagram illustrating example operations of a sleep network device requesting buffered frames in a direct wireless communication link environment.

FIG. 2 is a flow diagram ("flow") 200 illustrating example operations of a sleep network device requesting buffered frames in a direct wireless communication link environment. The flow 200 begins at block 202.

At block 202, a first network device of a communication network establishes a direct wireless communication link with a second network device of the communication network. With reference to the example of FIG. 1, the network device 104 (e.g., the link establishment unit 111) and the network device 106 (e.g., link establishment unit 119) can exchange handshake messages to establish a TDLS link 116. The flow continues at block 204.

At block 204, an indication that the first network device will switch to a power save operating mode is provided to the second network device. As will be further described below in FIG. 3, the power save unit 110 can determine that the first network device 104 should switch from an active operating mode to the power save operating mode. The first network device 104 (e.g., the power save unit 110) can transmit a notification to the second network device 106 to indicate that the first network device 104 will switch to the power save operating mode. The flow continues at block 206.

At block 206, while the first network device is in the power save operating mode, the first network device periodically transmits a trigger frame to the second network device to determine whether frames intended for the first network device are buffered at the second network device. As will be further described below with reference to FIGS. 3 and 5, during a PTI window interval, the first network device 104 (e.g., the power save unit 110) can periodically query the second network device 106 to prompt the second network device 106 to transmit buffered frames (if any). It is noted that the first network device 104 may be configured in the power save operating mode while the second network device 106 may remain in an active operating mode. The flow continues at block 208.

At block 208, the first network device receives the buffered frames from the second network device in response to transmitting the trigger frame to the second network device. As will be further described blow in FIGS. 3 and 5, in response to receiving the trigger frame from the first network device 104, the second network device 106 can determine whether there are buffered frames destined for the first network device 104. If so, the second network device 106 can transmit the buffered frames to the first network device 104. After receiving the last buffered frame from the second network device 106, the first network device 104 (e.g., the power save unit 110) can wait for a predetermined trigger time interval and transmit another trigger frame to the second network device after the trigger time interval elapses. From block 208, the flow ends.

Figure 3:
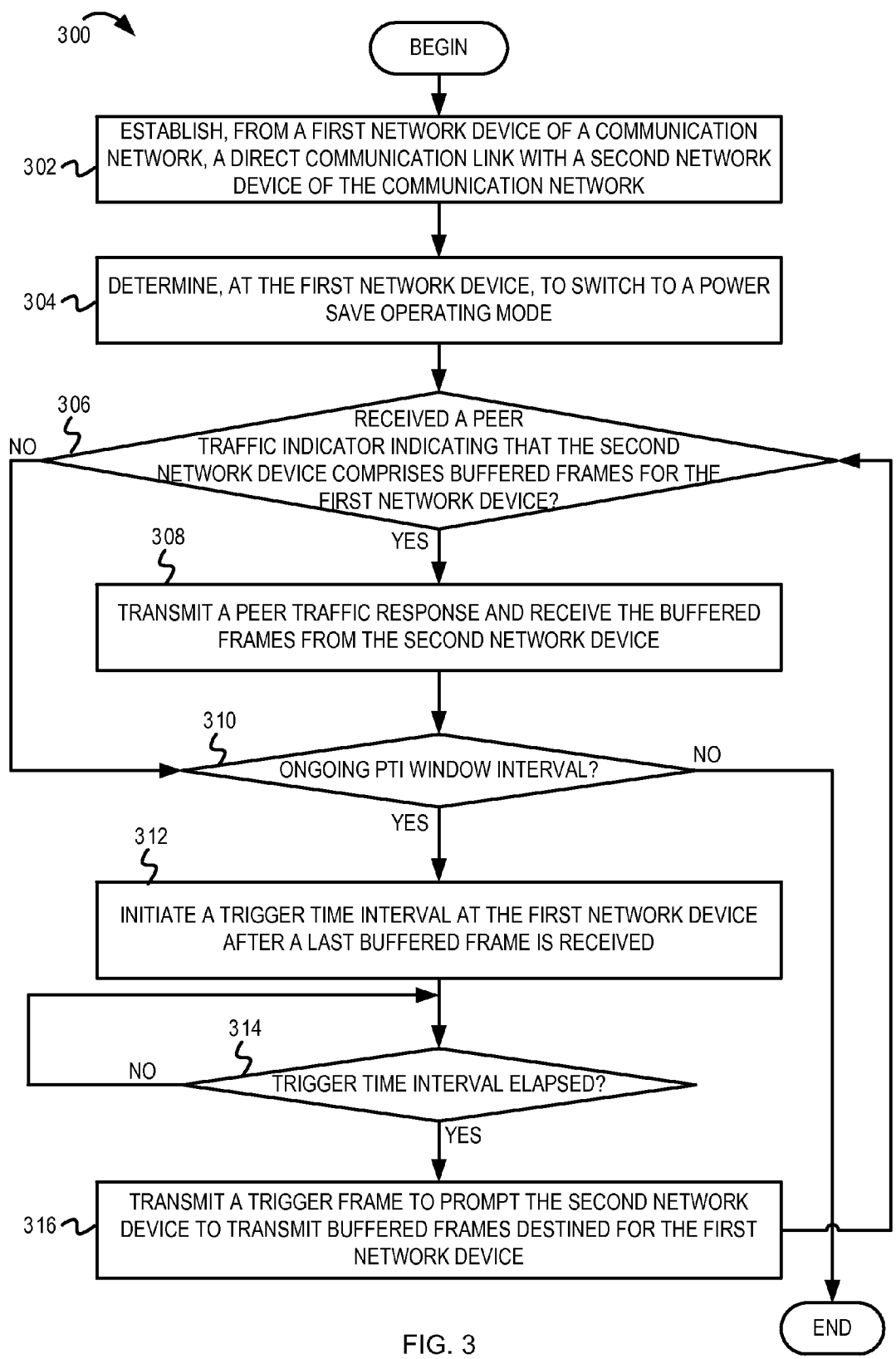
FIG. 3 is a flow diagram illustrating example operations of a sleep network device requesting buffered frames in a direct wireless communication link environment.

FIG. 3 is a flow diagram 300 illustrating example operations of a sleep network device requesting buffered frames in a direct wireless communication link environment. The flow 300 begins at block 302.

At block 302, a first network device of a communication network establishes a direct wireless communication link with a second network device of the communication network. With reference to the example of FIG. 1, the network device 104 (e.g., the link establishment unit 111) and the network device 106 (e.g., the link establishment unit 119) can exchange handshake messages to establish a TDLS link 116. The flow continues at block 304.

At block 304, the first network device determines to switch to a power save operating mode. With reference to the example of FIG. 1, the power save unit 110 can determine (e.g., based on a predetermined schedule, a user input, etc.) that the first network device 104 should switch from an active operating mode to the power save operating mode. As discussed above, the first network device 104 may consistently operate at a normal power level (e.g., may consistently be ON/enabled) in the active operating mode. As discussed above, the first network device 104 may operate at a low power level (e.g., a low power state or an inactive state) for at least a portion of the time during which the first network device 104 is in the power save operating mode. The first network device 104 (e.g., the power save unit 110) can transmit a notification to the second network device 106 to indicate that the first network device 104 will switch to the power save operating mode. In some embodiments, the power save unit 110 can transmit a NULL frame with a power management (PM) bit set to a predefined value (e.g., PM=1) to indicate that the first network device 104 will switch to the power save operating mode. However, in other embodiments, the power save unit 110 can transmit other suitable frames/messages/notifications to indicate that the first network device 104 will switch to the power save operating mode. After switching to the power save operating mode, the first network device 104 operates as the sleep network device; while the second network device 106 operates as the buffer network device for the sleep network device 104. The flow continues at block 306.

At block 306, it is determined whether the first network device received a peer traffic indicator frame indicating that the second network device comprises buffered frames for the first network device. Referring to sequence diagram 500 of FIG. 5, the buffer network device 106 transmits a PTI frame 502 to the access point 102. The PTI frame 502 indicates that the buffer network device 106 comprises buffered frames destined for the sleep network device 104. The access point 102 transmits a beacon frame 504 (e.g., at the start of a predetermined beacon interval 512) prompting the sleep network device 104 to switch from a sleep sub-state of the power save operating mode to an awake sub-state of the power save operating mode. As part of the beacon frame 504, the access point 102 can indicate the availability of buffered frames for the sleep network device 104. For example, the access point 104 can use a traffic indication map (TIM) in the beacon frame 504 to indicate availability of buffered frames for the sleep network device 104. In response to determining that the access point 102 comprises buffered frames for the sleep network device 104 (e.g., based on information in the beacon frame 504), the sleep network device 104 transmits a PSPOLL frame 506 (or another suitable trigger frame) to request the access point 102 to transmit the buffered frames. In response, the access point 102 forwards the PTI frame 502 (originally transmitted by the buffer network device 106) to the sleep network device 104. Referring back to FIG. 3, if it is determined that the sleep network device 104 received the PTI frame from the buffer network device 106, the flow continues at block 308. Otherwise, if it is determined that the sleep network device 104 did not receive the PTI frame from the buffer network device 106, the flow continues at block 310.

At block 308, the first network device transmits a peer traffic response (PTR) frame to the second network device and receives the buffered frames from the second network device. Referring to the sequence diagram 500 of FIG. 5, in response to receiving the PTI frame 502 from the buffer network device 106 (via the access point 102), the sleep network device 104 (e.g., the power save unit 110) can transmit a PTR frame 508 to the buffer network device 106 on the TDLS link 116. After receiving the PTR frame 508, the buffer network device 106 can transmit the buffered frames 510 to the sleep network device 104. In addition, the buffer network device 106 can also indicate the last buffered frame transmitted to the sleep network device 104. In one example, the buffer network device 106 can set an end of service period (EOSP) bit to a predetermined value (e.g., EOSP=1) in the last transmitted buffered frame. Setting the EOSP bit to the predetermined value can indicate that the buffer network device 106 does not have additional frames for the sleep network device 104. Referring back to FIG. 3, the flow continues at block 310.

At block 310, the first network device determines whether a PTI window interval is currently in progress. As described above, the time interval between the transmission of the last buffered frame (associated with a preceding PTI frame 502) and the transmission of the next PTI frame (indicating availability of new buffered frames) is referred to as the PTI window interval 514. Typically, the buffer network device 106 can transmit a PTI frame at predetermined periodic intervals. In some embodiments, the PTI window interval 514 can be one beacon interval. In another embodiment, the PTI window interval 514 can be less than or greater than one beacon interval. As will be further described below, during the PTI window interval 514, the sleep network device 104 (e.g., the power save unit 110) can periodically query the buffer network device 106 to prompt the buffer network device 106 to transmit buffered frames (if any). If the PTI window interval 514 is currently in progress, the flow continues at block 312. Otherwise, the flow ends.

At block 312, the first network device initiates a trigger time interval after the last buffered frame is received from the second network device. After receiving the last buffered frame (e.g., a frame with EOSP bit=1), the sleep network device 104 (e.g., the power save unit 110) can initiate a trigger time interval (not shown in FIG. 5) to determine when to transmit a trigger frame to the buffer network device 106. As described above, during the PTI window interval 514, the sleep network device 104 can periodically transmit the trigger frame to the buffer network device 106 to proactively request buffered frames (if any) destined for the sleep network device 104. In some embodiments, the trigger time interval can be selected based on knowledge of the PTI window interval 514. For example, the sleep network device 104 (e.g., the power save unit 110) can select the trigger time interval so that the PTI window interval 514 comprises at least two (or another suitable number) of trigger time intervals. In other words, the sleep network device 104 (e.g., the power save unit 110) can select the trigger time interval so that it can query the buffer network device 106 at least twice (or another suitable number) during the PTI window interval 514. In other embodiments, the trigger time interval can be another suitable predetermined or dynamically configured time interval. The sleep network device 104 can periodically transmit a trigger frame to the buffer network device 106 until the next PTI frame 522 is received from the buffer network device 106. The flow continues at block 314.

At block 314, it is determined whether the trigger time interval has elapsed. For example, the power save unit 110 can determine whether the trigger time interval initiated at block 312 has elapsed. If the trigger time interval has elapsed, the flow continues at block 316. Otherwise, if the trigger timer has not elapsed, the flow loops back to block 314 where the sleep network device 104 waits for the trigger time interval to elapse.

Figure 5:
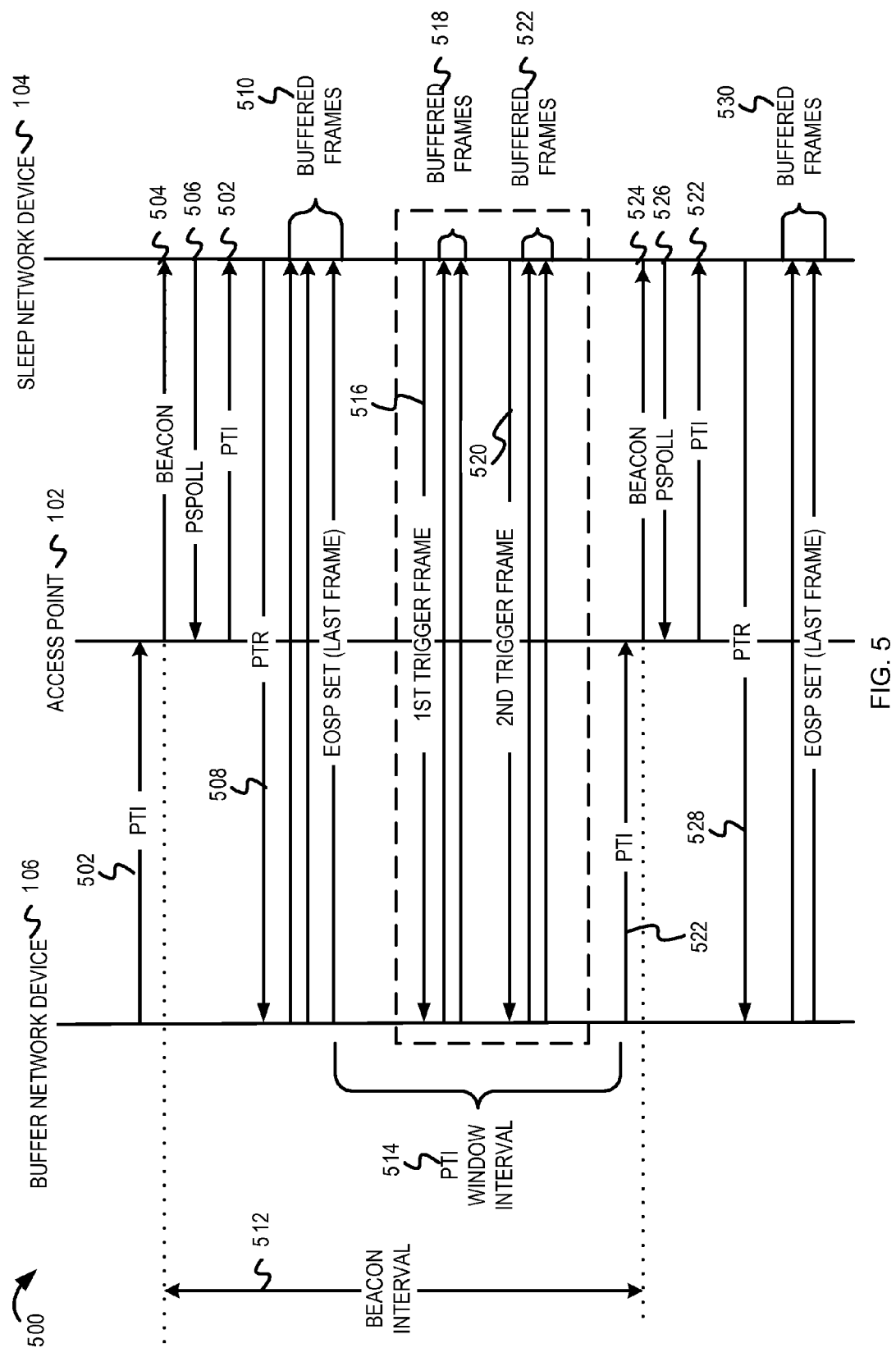
FIG. 5 is a sequence diagram illustrating example operations of a sleep network device requesting buffered frames in a direct wireless communication link environment.

At block 316, the first network device transmits a trigger frame to the second network device to prompt the second network device to transmit buffered frames destined for the first network device. With reference to the example sequence diagram 500 of FIG. 5, the sleep network device 104 (e.g., the power save unit 110) can transmit a first trigger frame 516 to the buffer network device 106 (via the TDLS link 116) to request buffered frames destined for the sleep network device 104. For example, after the trigger time interval elapses, the sleep network device 104 (e.g., the power save unit 110) can switch from the sleep sub-state of the power save operating mode to the awake sub-state of the power save operating mode. In the awake sub-state, the sleep network device 104 can transmit the first trigger frame 516 to the buffer network device 106. In one embodiment, the trigger frame 516 can be a QoS NULL data frame. In another embodiment, the trigger frame 516 can be a NULL frame with a power management (PM) bit set to a predetermined value (e.g., PM=1). It is noted that in other embodiments, the trigger frame 516 can be another suitable frame/message. In the example of FIG. 5, the buffer network device 106 comprises buffered frames 518 for the sleep network device 106 and therefore, transmits the buffered frames 518 to the sleep network device 104 in response to receiving the first trigger frame 516. As depicted in FIG. 5, after the sleep network device 104 receives the last buffered frame (e.g., a frame with EOSP=1), the sleep network device 104 can switch back to the sleep sub-state of the power save operating mode. The flow then loops back to block 306 where the sleep network device 104 (e.g., the power save unit 110) determines whether it received another PTI frame from the buffer network device 106.

As further depicted in the example of FIG. 5, after receiving the last buffered frame 518, the sleep network device 104 (e.g., the power save unit 110) can switch to the sleep sub-state and initiate another trigger time interval. After the next trigger time interval elapses, the sleep network device 104 can switch to the awake sub-state of the power save operating mode and can transmit a second trigger frame 520 (e.g., because the PTI window interval 514 is still in progress). In the example of FIG. 5, the buffer network device 106 has buffered an additional set of frames 522 for the sleep network device 104. Therefore, the buffer network device 106 transmits the buffered frames 522 to the sleep network device 104 in response to receiving the second trigger frame 520. The sleep network device 104 can continue to transmit a trigger frame to the buffer network device 106 at periodic intervals until the PTI window interval 514 elapses and the sleep network device 104 receives the next PTI frame 522 from the buffer network device 106.

As depicted with reference to FIG. 5, the PTI window interval 514 elapses when the buffer network device 106 transmits the next PTI frame 522 to the access point 102 (for forwarding to the sleep network device 104). As discussed above with reference to block 506, the access point 102 transmits a beacon frame 524 to the sleep network device 104 at the start of the next beacon interval (not shown in FIG. 5). In response, the sleep network device 104 transmits a PSPOLL frame 526 (or another suitable trigger frame) to request frames buffered at the access point 102 and receives the PTI frame 522. The sleep network device 104 transmits the PTR frame 528 to the buffer network device 106 and receives the buffered frames 530 from the buffer network device 106. After receiving the last buffered frame, the sleep network device 104 can restart the trigger time interval and transmit the trigger frame, as described above with reference to blocks 310-316.

Figure 4:
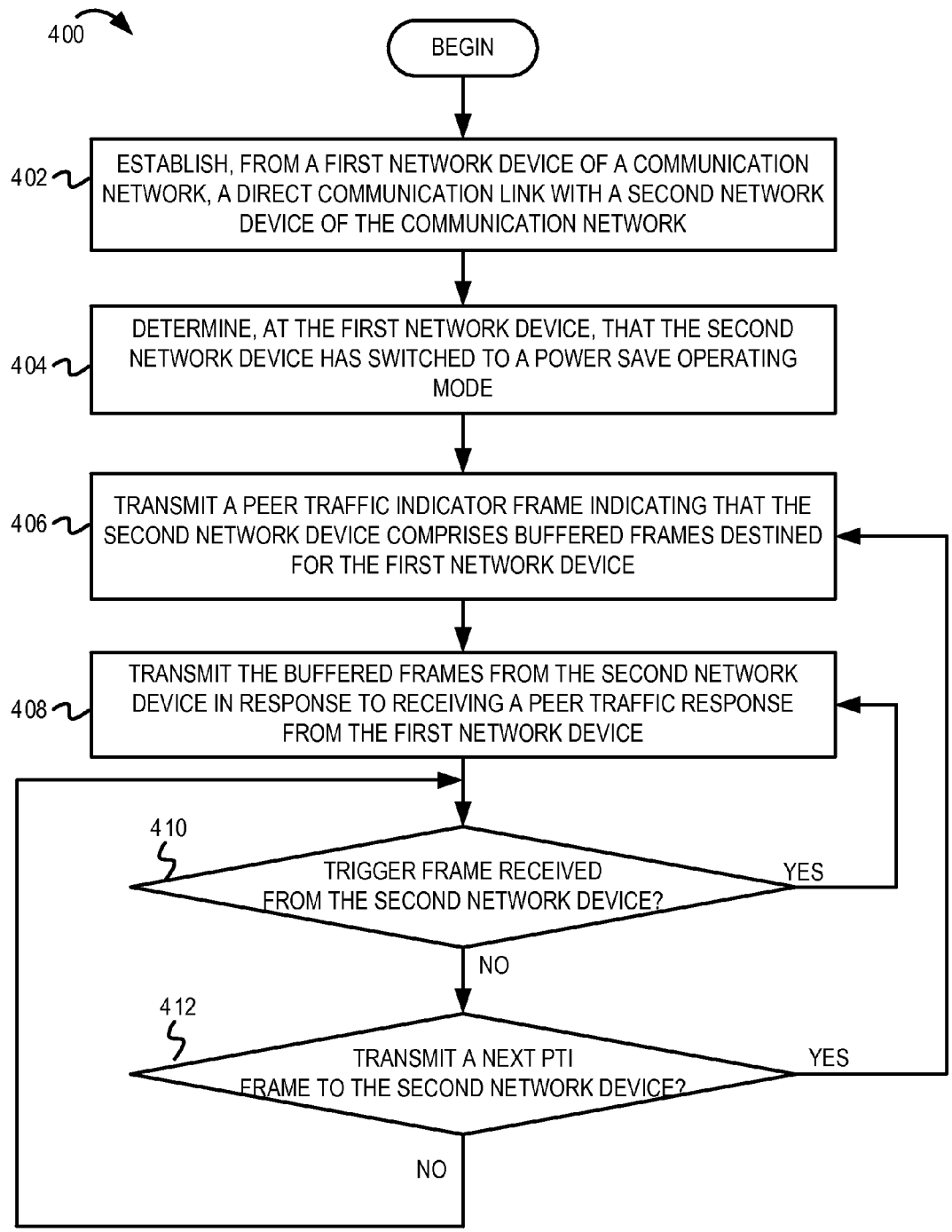
FIG. 4 is a flow diagram illustrating example operations of a buffer network device transmitting buffered frames in a direct wireless communication link environment.

FIG. 4 is a flow diagram 400 illustrating example operations of one embodiment of a buffer network device in a direct wireless communication link environment. The flow 400 begins at block 402.

At block 402, a first network device of a communication network establishes a direct wireless communication link with a second network device of the communication network. With reference to the example of FIG. 1, the network device 104 (e.g., the link establishment unit 111) and the network device 106 (e.g., the link establishment unit 119) can exchange handshake messages to establish a TDLS link 116. The flow continues at block 404.

At block 404, the first network device determines that the second network device has switched to a power save operating mode. As described above with reference to block 304 of FIG. 3, the first network device 106 (e.g., the power save unit 118) can receive a notification (e.g., a NULL frame with PM=1) from the second network device 104 (e.g., the power save unit 110) indicating that the network device 104 will switch to the power save operating mode. After the second network device 104 switches to the power save operating mode, the first network device 106 operates as the buffer network device 106, while the second network device 104 operates as the sleep network device 104. After the buffer network device 106 receives the notification indicating that the sleep network device 104 will switch to the power save operating mode, the buffer network device 106 can buffer/store any subsequent frames destined for the sleep network device 104 in the data buffer 120 (of the buffer network device 106). The flow continues at block 406.

At block 406, the first network device transmits a peer traffic indicator frame to the second network device to indicate that the first network device comprises buffered frames for the second network device. As described above with reference to block 306 of FIG. 3, the buffer network device 106 can transmit a PTI frame 502 (or another suitable notification of available buffered frames) to the sleep network device 104 via the access point 102. The flow continues at block 408.

At block 408, the first network device transmits the buffered frames to the second network device in response to receiving a peer traffic response from the second network device. As discussed above with reference to block 308 of FIG. 3, the buffer network device 106 can receive the PTR frame 508 from the sleep network device 104. In response, the buffer network device 106 (e.g., a transceiver unit) can access the data buffer 120, retrieve the buffered frames 510 destined for the sleep network device 104, and transmit the buffered frames 510 to the sleep network device 104. The buffer network device 106 can indicate an end of service period (e.g., by setting EOSP=1) in a last buffered frame transmitted from the buffer network device 106. The flow continues at block 410.

At block 410, the first network device determines whether a trigger frame was received from the second network device. As discussed above with reference to blocks 310-316 of FIG. 3, during the PTI window interval 514, the sleep network device 104 (e.g., the power save unit 110) can be configured to periodically transmit a trigger frame to the buffer network device 106 to specifically request for buffered frames intended for the sleep network device 104. If the buffer network device 106 determines that the trigger frame was received from the sleep network device 104, the flow continues at block 408 where the buffer network device 106 transmits buffered frames intended for the sleep network device 104. Otherwise, if the buffer network device 106 determines that the trigger frame was not received from the sleep network device 104, the flow continues at block 412.

At block 412, the first network device determines whether to transmit a next PTI frame to the second network device. In some embodiments, the buffer network device 106 can transmit the next PTI frame 522 after a predetermined time interval. In some embodiments, the predetermined time interval between consecutive PTI frames 502 and 522 may be equal to or a multiple of the beacon interval 512. In other embodiments, the predetermined time interval between consecutive PTI frames 502 and 522 may be another suitable predetermined or dynamically configured time interval. In some embodiments, the predetermined time interval may be the PTI window interval 514 and may be initiated after a last buffered frame is transmitted in a preceding service period (associated with a preceding PTI frame 502). In another embodiment, the start of the predetermined time interval may be the time instant at which the preceding PTI frame 502 was transmitted. In some embodiments, the buffer network device 106 may transmit the PTI frame before the start of the next beacon interval (e.g., a few milliseconds before the access point 102 transmits the beacon message 504). It is noted that the buffer network device 106 may transmit the PTI frame 522 only if the buffer network device 106 comprises buffered frames destined for the sleep network device 104. If the buffer network device 106 determines to transmit another PTI frame 522 to the sleep network device, the flow continues at block 406 where the next PTI frame 522 is transmitted to the sleep network device 104. Otherwise, if the buffer network device 106 determines not to transmit another PTI frame to the sleep network device 104, the flow loops back to block 410, where the buffer network device 106 determines whether another trigger frame was received from the sleep network device 104.

It is noted that although FIGS. 2-5 depicts the buffer network device 106 transmitting the buffered frames to the sleep network device 104 in response to receiving the trigger frame from the sleep network device 104, embodiments are not so limited. In some embodiments, in response to receiving the trigger frame from the sleep network device 104, the buffer network device 106 can access the data buffer 120 to determine whether it (i.e., the buffer network device 106) has buffered frames destined for the sleep network device 104. In some implementations, the buffer network device 106 may not respond to the trigger frame if the buffer network device 106 does not have any buffered frames destined for the sleep network device 104. The sleep network device 104 may infer that there are no buffered frames if it does not receive a response to the trigger frame within a predetermined time interval. Accordingly, the sleep network device 104 can switch to the sleep sub-state and can restart the trigger time interval. In another implementation, the buffer network device 106 may transmit a NULL frame with predetermined fields set to corresponding predetermined values (e.g., EOSP=1) to indicate that there are no buffered frames destined for the sleep network device 104.

Figure 6:
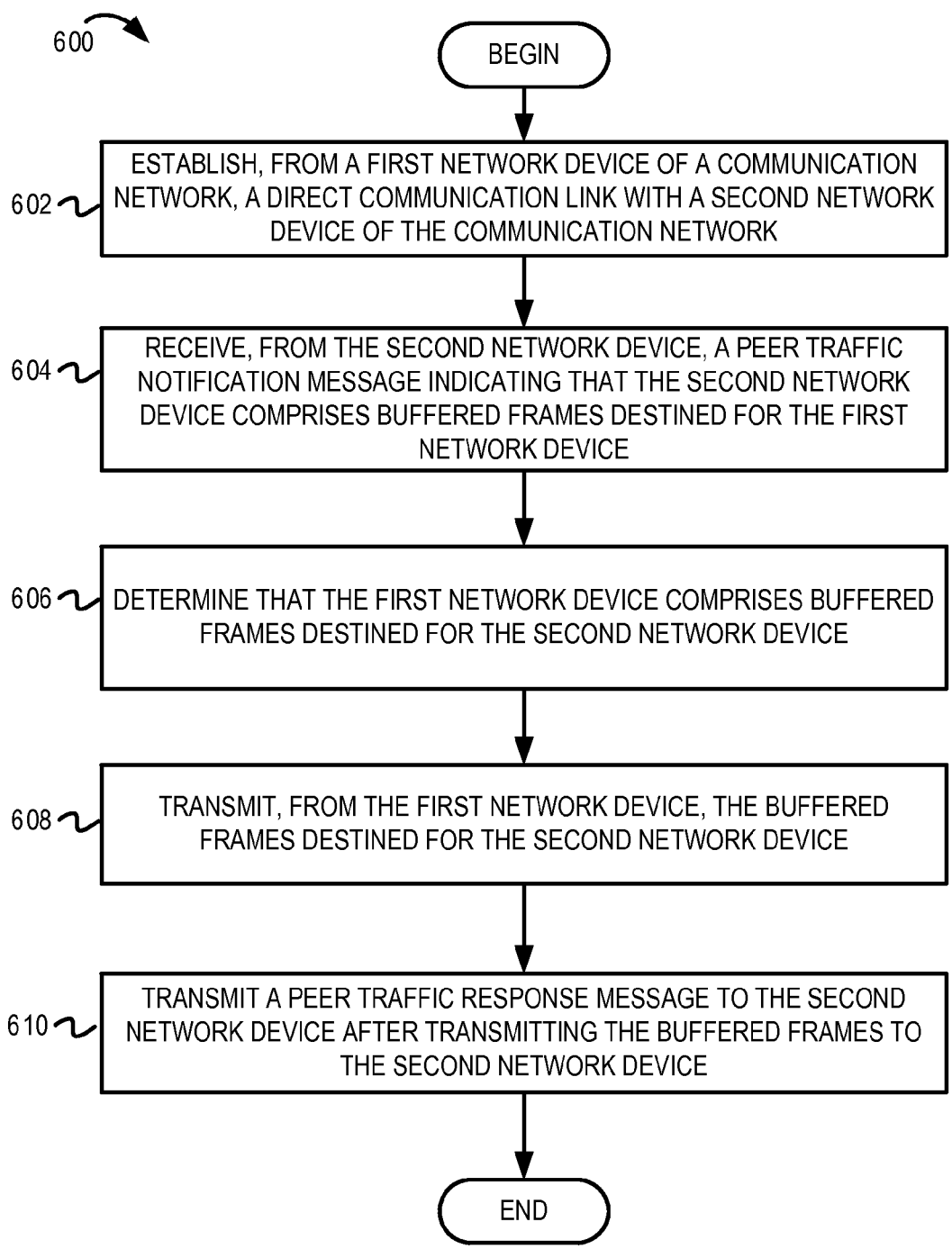
FIG. 6 is a flow diagram illustrating example operations for exchanging buffered frames between two network devices in a power save operating mode.
Figure 7:
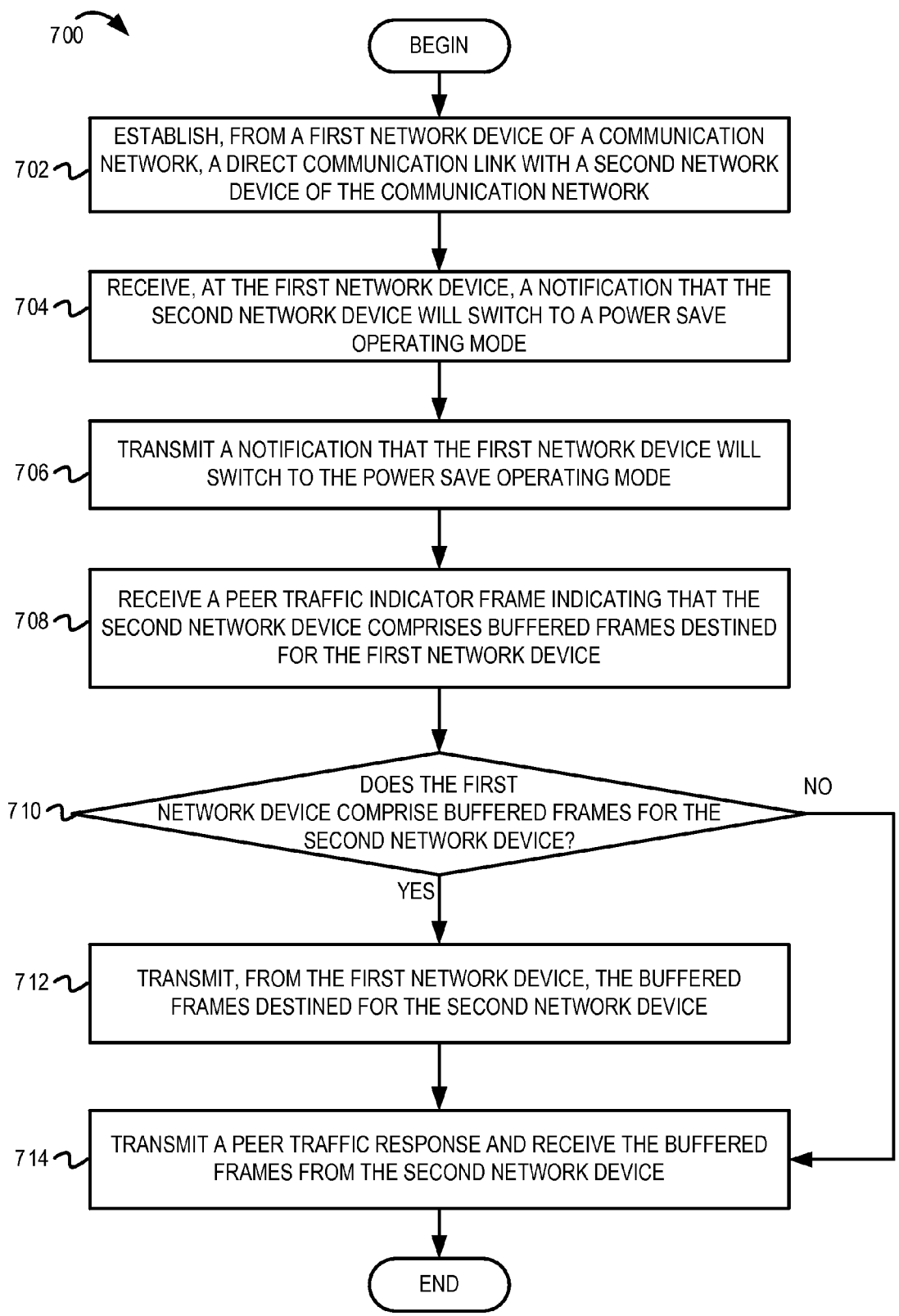
FIG. 7 is a flow diagram illustrating example operations for exchanging buffered frames between two network devices in a power save operating mode.
Figure 8:
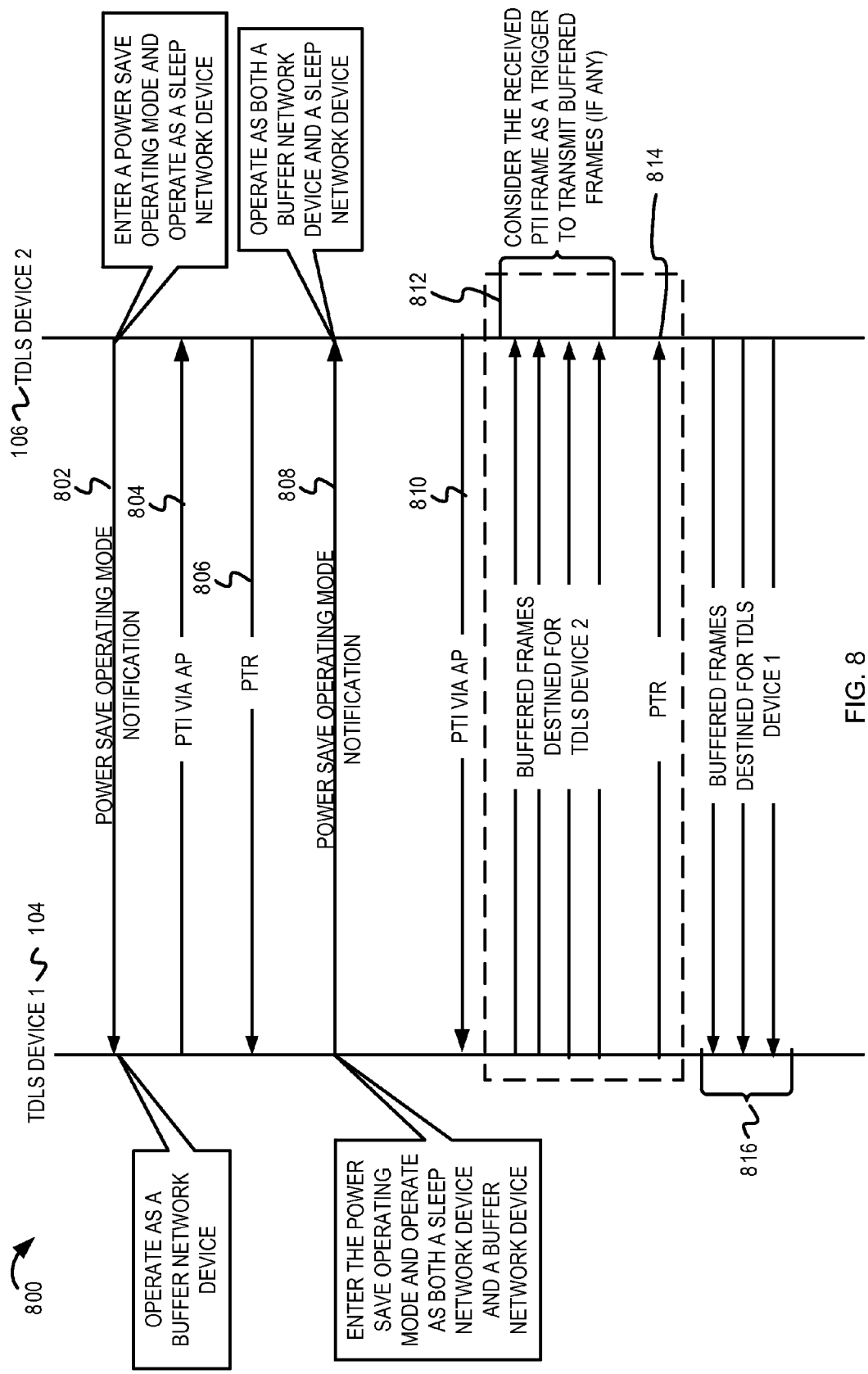
FIG. 8 is a sequence diagram illustrating example operations for exchanging buffered frames between two network devices in a power save operating mode.

In some embodiments, both the network devices that are part of the TDLS link 116 can switch to the power save operating mode and can buffer frames intended for the other network device. In other words, both the network devices 104 and 106 can switch to the power save operating mode. While in the power save operating mode, the network device 104 can buffer frames (e.g., in the data buffer 112) destined for the network device 106; while the network device 106 can buffer frames (e.g., in the data buffer 120) destined for the network device 104. Thus, each of the network devices 104 and 106 can operate as both a sleep network device and a buffer network device. FIGS. 6-8 will further illustrate operations of the sleep and buffer network devices.

FIG. 6 is a flow diagram 600 illustrating example operations for exchanging buffered frames between two network devices in the power save operating mode. The flow 600 begins at block 602.

At block 602, a direct wireless communication link is established between a first network device and a second network device of a communication network. With reference to the example of FIG. 1, the first network device 104 (e.g., the link establishment unit 111) and the second network device 106 (e.g., the link establishment unit 119) can exchange handshake messages to establish a TDLS link 116. The flow continues at block 604.

At block 604, the first network device receives a peer traffic notification message from the second network device. The peer traffic notification message indicates that the second network device 106 comprises buffered frames destined for the first network device 104. It is noted that in some embodiments, the first network device 104 and the second network device 106 may each be configured in a power save operating mode. The flow continues at block 606.

At block 606, the first network device determines that the first network device comprises buffered frames destined for the second network device. As will be further described with reference to FIGS. 7 and 8, the first network device 104 can access its data buffer 112 and determine that it comprises buffered frames for the second network device 106. The flow continues at block 608.

At block 608, the buffered frames are transmitted from the first network device to the second network device. As will be further described below with reference to FIGS. 7 and 8, the first network device 104 can transmit the buffered frames to the second network device 106 prior to transmitting a response to the peer traffic notification message (received at block 604). The flow continues at block 610.

At block 610, the first network device transmits a peer traffic response message is transmitted to the second network device after transmitting the buffered frames to the second network device. From block 610, the flow ends.

FIG. 7 is a flow diagram 700 illustrating example operations for exchanging buffered frames between two network devices in the power save operating mode. The flow 700 begins at block 702.

At block 702, a direct wireless communication link is established between a first network device and a second network device of a communication network. With reference to the example of FIG. 1, the first network device 104 (e.g., the link establishment unit 111) and the second network device 106 (e.g., the link establishment unit 119) can exchange handshake messages to establish a TDLS link 116. The flow continues at block 704.

At block 704, the first network device receives a notification that the second network device will switch to a power save operating mode. Referring to the sequence diagram 800 of FIG. 8, the first network device 104 can receive a notification 802 from the second network device 106 (e.g., the power save unit 118) indicating that the second network device 106 will switch to the power save operating mode. In some embodiments, the notification 802 can be a NULL frame with predetermined fields set to corresponding predetermined values. For example, the second network device 106 (e.g., the power save unit 118) can transmit a NULL frame with a PM bit=1 to indicate that the second network device 106 will switch to the power save operating mode. It is noted that in other embodiments, the second network device 106 can transmit other suitable messages to indicate that it will switch to the power save operating mode. As discussed above with reference to block 404 of FIG. 4, after the second network device 106 switches to the power save operating mode, the first network device 104 operates as the buffer network device 104; while the second network device 106 operates as the sleep network device 106. The buffer network device 104 can buffer/store any subsequent frames destined for the sleep network device 106 in the data buffer 112 (of the buffer network device 104). The flow continues at block 706.

At block 706, the first network device transmits a notification that the first network device will switch to the power save operating mode. As described above with reference to block 304 of FIG. 3, the first network device 104 (e.g., the power save unit 110) can determine (e.g., based on a predetermined schedule, a user input, etc.) to switch from the active operating mode to the power save operating mode. The first network device 104 (e.g., the power save unit 110) can transmit a notification to the second network device 106 to indicate that the first network device 104 will also switch to the power save operating mode. However, because the second network device 106 is already in the power save operating mode, the second network device 106 may not receive this notification. Therefore, as depicted in the sequence diagram 800 of FIG. 8, the first network device 104 transmits a PTI frame 804 via the access point 102 (not shown in FIG. 8), as described with reference to block 306 of FIG. 3. In response, the second network device 106 switches to an awake sub-state of the power save operating mode, receives the PTI frame 804 from the access point 102, and transmits a PTR frame 806 to the first network device 104 on the TDLS link 116, as described above with reference to block 308 of FIG. 3. In response to receiving the PTR frame 806, the first network device 104 (e.g., the power save unit 110) transmits a notification 808 indicating that the first network device 104 will switch to the power save operating mode. As discussed above, the notification 808 can be a NULL frame with a PM bit=1 or another suitable message. After the first network device 104 switches to the power save operating mode, the first network device 104 and the second network device 106 can each be a buffer network device and a sleep network device. In other words, the first network device 104 can buffer frames destined for the second network device 106 and vice versa. The flow continues at block 708.

At block 708, the first network device receives a peer traffic indicator frame indicating that the second network device comprises buffered frames for the first network device. Referring to the example sequence diagram 800 of FIG. 8, the first network device 104 (e.g., the power save unit 110) can receive the PTI frame 810 from the second network device 106 via the access point 102, as previously described with reference to block 306 of FIG. 3. The PTI frame 810 can indicate that the second network device 106 comprises buffered frames destined for the first network device 104. The flow continues at block 710.

At block 710, it is determined whether the first network device comprises buffered frames destined for the second network device. When the first network device 104 (e.g., the power save unit 110) receives the PTI frame 810 from the second network device 106 (e.g., the power save unit 118), the second network device 106 may not switch back to the sleep sub-state until it receives the peer traffic response frame from the first network device 104. Accordingly, the first network device 104 can interpret the PTI frame 810 (received from the second network device 106) as a trigger frame to determine whether there are buffered frames destined for the second network device 106. If there are buffered frames destined for the second network device 106, the first network device 104 can transmit the buffered frames to the second network device 106 before acknowledging the received PTI frame 810. In one example, in response to receiving the PTI frame 810, the power save unit 110 can access the data buffer 112 and determine whether there are buffered frames destined for the second network device 106. If the first network device 104 comprises buffered frames destined for the second network device 106, the flow continues at block 712. Otherwise, the flow continues at block 714.

At block 712, the first network device transmits the buffered frames to the second network device. The flow 700 moves from block 710 to block 712 if the first network device 104 comprises buffered frames destined for the second network device 106. As depicted in FIG. 7, in response to receiving the PTI frame 810 from the second network device 106, the first network device 104 transmits the buffered frames 812 to the second network device 106. The flow continues at block 714.

At block 714, the first network device transmits a peer traffic response and receives the buffered frames from the second network device. The flow 700 moves from block 712 to block 714 and the first network device 104 transmits a PTR frame 814 to the second network device 106 after transmitting all the buffered frames 812 destined for the second network device 106. Additionally, the flow 700 also moves from block 710 to block 714 if the first network device 104 does not comprise any buffered frames for the second network device 106. As depicted in FIG. 8, after transmitting the PTR frame 814, the first network device 104 receives buffered frames 816 from the second network device 106. From block 714, the flow ends.

It should be understood that FIGS. 1-8 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although not depicted in FIGS. 6-8, it is noted that before the first network device 104 switches to the power save operating mode (e.g., between blocks 704 and 706), the second network device 106 can execute operations described above with reference to FIGS. 2-5 to receive buffered frames (if any) from the first network device 104.

Although FIGS. 6-8 describe the first network device 104 transmitting all the buffered frames 812 to the second network device 106 (in response to receiving the PTI frame 810 from the second network device 106), embodiments are not so limited. Typically, the second network device 106 (that transmits the PTI frame 810) may expect to receive the PTR frame 814 from the first network device 104 within a predetermined time interval ("PTR reception time interval"). The first network device 104 can determine a maximum number of buffered frames that it can transmit to the second network device 106, so that it (i.e., the first network device 104) can also transmit the PTR frame 814 within the PTI reception time interval. Depending on the duration of the PTI reception time interval and the number of buffered frames, the first network device 104 may transmit some or all the buffered frames 812 to the second network device 106 before transmitting the PTR frame 814 to the second network device 106.

With reference to FIGS. 2-5, it is noted that in some embodiments, the sleep network device 104 can transmit a NULL frame with PM=1 as a trigger frame to request buffered frames from the buffer network device 106 during the PTI window interval. In other words, in this embodiment, the NULL frame with PM=1 can serve two purposes. In response to receiving a first NULL frame with PM=1 from the network device 104, the network device 106 can infer that the network device 104 will switch to the power save operating mode. Accordingly, the network device 106 can buffer subsequent frames destined for the network device 104. In response to receiving a subsequent NULL frame with PM=1, the network device 106 can interpret this received frame as a trigger frame requesting buffered frames destined for the network device 104.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
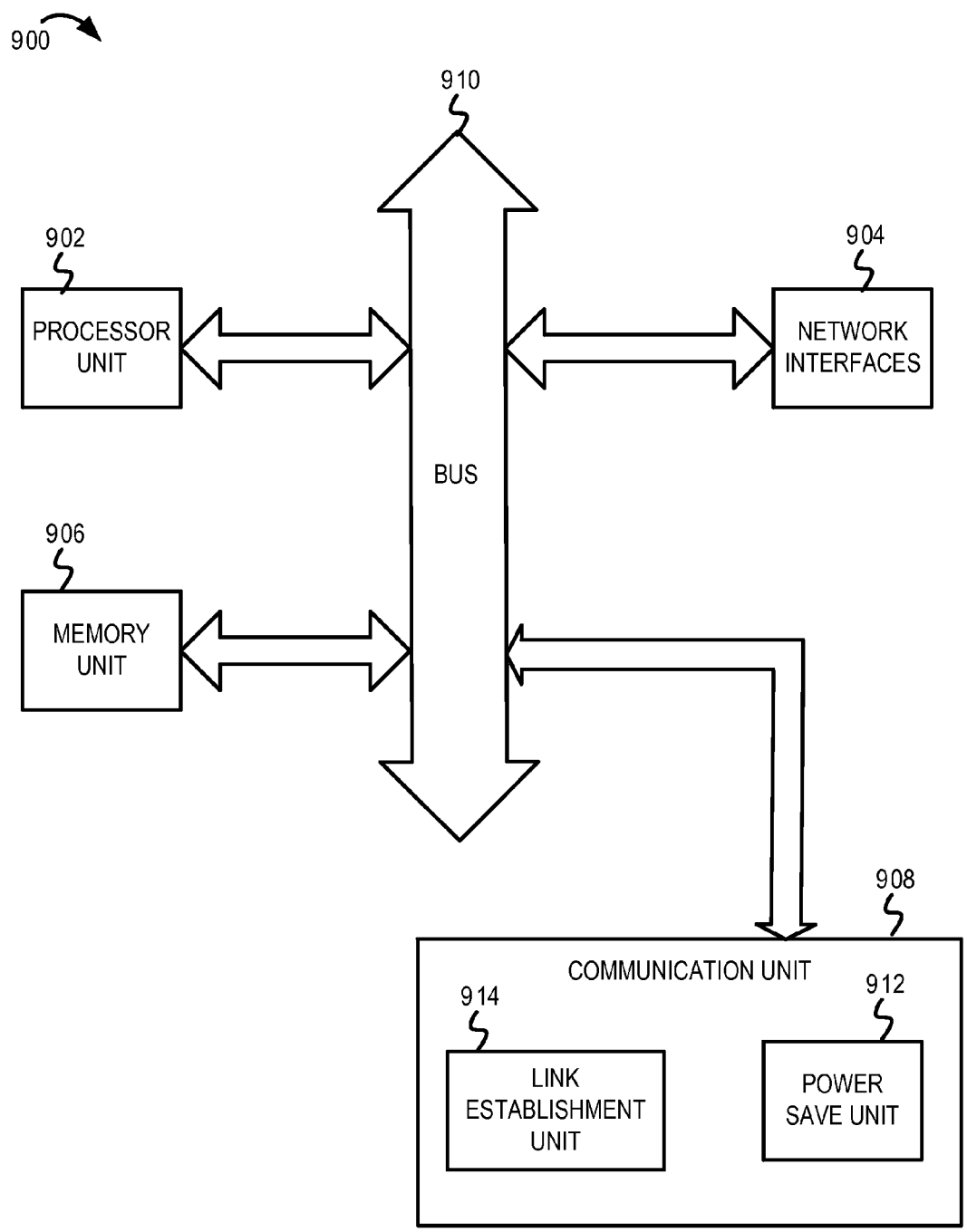
FIG. 9 is a block diagram of one embodiment of an electronic device including a mechanism for improving performance in a direct wireless communication link environment.

FIG. 9 is a block diagram of one embodiment of an electronic device 900 including a mechanism for improving performance in a direct wireless communication link environment. In some implementations, the electronic device 900 can be a standalone WLAN device configured to communicate with other WLAN-capable network devices using WLAN communication protocols. In another implementation, the electronic device 900 may be one of a desktop computer, laptop computer, a tablet computer, a mobile phone, a smart appliance, a network bridging device, or other electronic system configured to communicate using one or more communication protocols across corresponding one or more communication networks. The electronic device 900 includes a processor unit 902 (possibly including multiple processors, multiple cores, multiple nodes, and/or implementing multi-threading, etc.). The electronic device 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 also includes a bus 910 (e.g., PCI, ISA, PCI-Express, HyperTransport®, InfiniBand®, NuBus, AHB, AXI, etc.), and network interfaces 904 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 900 can comprise a plurality of network interfaces—each of which couples the electronic device 900 to a different communication network. For example, the electronic device 900 can comprise a PLC interface, an Ethernet interface, and a WLAN interface that couple the electronic device 900 with a powerline communication network, an Ethernet, and a wireless local area network respectively. Furthermore, in some embodiments, the electronic device 900 can execute an IEEE Std. 1905.1 protocol for implementing hybrid communication functionality.

The electronic device 900 also includes a communication unit 908. The communication unit 908 comprises a power save unit 912 and a link establishment unit 914. The link establishment unit 914 can execute suitable operations for establishing a direct wireless communication link with a second electronic device. In some embodiments, the electronic device 900 can switch to a power save operating mode, while the second electronic device (that is part of the direct wireless communication link with the electronic device 900) can operate in an active operating mode. In this embodiment, the power save unit 912 can implement functionality to periodically transmit a trigger frame to the second electronic device and to receive buffered frames intended for the electronic device 900 without exchanging PTI/PTR frames, as described above with reference to FIGS. 1-5. In some embodiments, the electronic device 900 and a second electronic device (that is part of a direct wireless communication link with the electronic device 900) can each switch to the power save operating mode. In this embodiment, the power save unit 912 can implement functionality to transmit buffered frames destined for the second electronic device in response to receiving a PTI frame from the second electronic device, as described above with reference to FIGS. 1 and 6-8.

Any one of these functionalities may be partially (or entirely) implemented in hardware and/or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). For example, in addition to the processor unit 902 coupled with the bus 910, the communication unit 908 may comprise at least one additional processor unit. The processor unit 902, the memory unit 906, and the network interfaces 904 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the inventive subject matter is not limited to them. In general, techniques for improving performance in a direct wireless communication link environment as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network communication, the method comprising:
    establishing, from a first network device, a direct wireless communication link with a second network device of a communication network;
    providing an indication to the second network device that the first network device will enter a power save operating mode;
    while the first network device is in the power save operating mode,
        transmitting a trigger frame from the first network device to the second network device to determine whether a first frame intended for the first network device is buffered at the second network device, wherein the first network device transmits the trigger frame prior to a predetermined time for transmission by the second network device of a peer traffic indicator (PTI) frame for indicating that the first frame intended for the first network device is buffered at the second network device; and
        receiving the first frame from the second network device in response to said transmitting the trigger frame to the second network device.

2. The method of claim 1, wherein said providing the indication that the first network device will enter the power save operating mode comprises:
    transmitting, to the second network device, a frame with a power management bit set to a predefined value to indicate that the first network device will enter the power save operating mode.

3. The method of claim 1, wherein said providing the indication that the first network device will enter the power save operating mode comprises transmitting a NULL frame with a power management bit set to a predefined value.

4. The method of claim 1, wherein the trigger frame comprises a NULL frame with a power management bit set to a predefined value.

5. The method of claim 1, further comprising:
    receiving, at the first network device, a first peer traffic notification message from the second network device, wherein the first peer traffic notification message indicates that the second network device has buffered a second buffered frame intended for the first network device;
    transmitting, from the first network device, a peer traffic response message to the second network device to request transmission of the second buffered frame; and
    receiving, from the second network device, the second buffered frame intended for the first network device.

6. The method of claim 1,
wherein the predetermined time for transmission of the PTI frame is defined by a PTI window interval, and wherein the PTI window interval is a duration between reception of a last buffered frame associated with a previous PTI frame and a transmission of a next PTI frame.

7. The method of claim 6, wherein the PTI window interval comprises one beacon interval.

8. The method of claim 6, further comprising:
determining whether a trigger time interval is elapsed, wherein the PTI window interval comprises one or more consecutive trigger time intervals; and
if determined that the trigger time interval has elapsed,
transmitting the trigger frame from the first network device to the second network device; and
restarting the trigger time interval at the first network device.

9. The method of claim 1, wherein said transmitting the trigger frame from the first network device to the second network device comprises:
switching, at the first network device, from a sleep sub-state of the power save operating mode to an awake sub-state of the power save operating mode;
transmitting the trigger frame from the first network device to the second network device;
if the second network device has buffered the first frame intended for the first network device,
receiving the first frame from the second network device; and
if the second network device has not buffered the first frame intended for the first network device or after receiving the first frame from the second network device,
switching from the awake sub-state to the sleep sub-state.

10. The method of claim 1, wherein the first network device and the second network device each implement wireless local area network (WLAN) protocols, wherein the direct wireless communication link is a tunneled direct link setup (TDLS) communication link.

11. The method of claim 1, wherein the first network device is configured to operate in the power save operating mode, wherein the second network device is configured to operate in an active operating mode.

12. A method comprising:
establishing, from a first network device, a direct wireless communication link with a second network device of a communication network;
receiving from the second network device a notification that the second network device is entering a power save operating mode;
while the first network device and the second network device are in the power save operating mode, receiving, at the first network device, a peer traffic notification message from the second network device, wherein the peer traffic notification message indicates that the second network device has buffered a first buffered frame intended for the first network device;
determining that the first network device has buffered a second buffered frame intended for the second network device;
transmitting the second buffered frame from the first network device to the second network device; and
transmitting a peer traffic response message to the second network device after transmitting the second buffered frame from the first network device to the second network device.

13. The method of claim 12, further comprising:
transmitting the second buffered frame intended for the second network device and transmitting the peer traffic response message to the second network device before a peer traffic response time interval elapses.

14. The method of claim 12, wherein the first network device and the second network device each implements wireless local area network (WLAN) protocols, wherein the direct wireless communication link is a tunneled direct link setup (TDLS) communication link.

15. A first network device comprising:
a processor; and
a memory coupled to the processor;
the processor configured to execute instructions stored in the memory that cause the first network device to:
establish a direct wireless communication link between the first network device and a second network device of a communication network; and
provide an indication to the second network device that the first network device will enter a power save operating mode;
while the first network device is in the power save operating mode,
transmit a trigger frame from the first network device to the second network device to determine whether a first frame intended for the first network device is buffered at the second network device, wherein the first network device transmits the trigger frame prior to a predetermined time for transmission by the second network device of a peer traffic indicator (PTI) frame for indicating that the first frame intended for the first network device is buffered at the second network device; and
receive the first frame from the second network device in response to transmitting the trigger frame to the second network device.

16. The first network device of claim 15, wherein the processor is configured to execute additional instructions stored in the memory that cause the first network device to:
receive a first peer traffic notification message from the second network device, wherein the first peer traffic notification message indicates that the second network device has buffered a second buffered frame intended for the first network device;
transmit a peer traffic response message to the second network device to request transmission of the second buffered frame; and
receive, from the second network device, the second buffered frame intended for the first network device.

17. The first network device of claim 15,
wherein the predetermined time for transmission of the PTI frame is defined by a PTI window interval, and wherein the PTI window interval is a duration between reception of a last buffered frame associated with a previous PTI frame and a transmission of a next PTI frame.

18. The first network device of claim 17, wherein the processor is configured to execute additional instructions stored in the memory that cause the first network device to:
determine whether a trigger time interval is elapsed, wherein the PTI window interval comprises one or more consecutive trigger time intervals; and if determined that the trigger time interval has elapsed,
  transmit the trigger frame to the second network; and
  restart the trigger time interval at the first network device.

19. The first network device of claim 15, wherein the processor is configured to execute additional instructions stored in the memory that cause the first network device to:
  switch from a sleep sub-state of the power save operating mode to an awake sub-state of the power save operating mode;
  transmit the trigger frame to the second network device;
  if the second network device has buffered the first frame intended for the first network device,
    receive the first frame from the second network device; and
  if the second network device has not buffered the first frame intended for the first network device or after receiving the first frame from the second network device,
    switch from the awake sub-state to the sleep sub-state.

20. The first network device of claim 15, wherein the first network device is configured to operate in the power save operating mode, wherein the second network device is configured to operate in an active operating mode.

21. A first network device comprising:
  a processor; and
  a memory coupled to the processor;
  the processor configured to execute instructions stored in the memory that cause the first network device to:
    establish a direct wireless communication link between the first network device and a second network device of a communication network; and
    receive from the second network device a notification that the second network device is entering a power save operating mode;
    while the first network device and the second network device are in the power save operating mode, receive a peer traffic notification message from the second network device, wherein the peer traffic notification message indicates that the second network device has buffered a first buffered frame intended for the first network device;
    determine that the first network device has buffered a second buffered frame intended for the second network device;
    transmit the second buffered frame from the first network device to the second network device; and
    transmit a peer traffic response message to the second network device after transmitting the second buffered frame from the first network device to the second network device.

22. The first network device of claim 21, wherein the processor is configured to execute additional instructions stored in the memory that cause the first network device to:
  transmit the second buffered frame intended for the second network device and transmit the peer traffic response message to the second network device before a peer traffic response time interval elapses.

23. A non-transitory machine-readable storage medium having machine executable instructions stored therein, the machine executable instructions comprising instructions to:
  establish a direct wireless communication link between from a first network device and a second network device of a communication network;
  provide an indication to the second network device that the first network device will enter a power save operating mode;
  while the first network device is in the power save operating mode,
    transmit a trigger frame from the first network device to the second network device to determine whether a first frame intended for the first network device is buffered at the second network device, wherein the first network device transmits the trigger frame prior to a predetermined time for transmission by the second network device of a peer traffic indicator (PTI) frame for indicating that the first frame intended for the first network device is buffered at the second network device; and
    receive the first frame from the second network device in response to said transmitting the trigger frame to the second network device.

24. The non-transitory machine-readable storage medium of claim 23, wherein said instructions further comprise instructions to:
  receive, at the first network device, a first peer traffic notification message from the second network device, wherein the first peer traffic notification message indicates that the second network device has buffered a second buffered frame intended for the first network device;
  transmit a peer traffic response message to the second network device to request transmission of the second buffered frame; and
  receive, from the second network device, the second buffered frame intended for the first network device.

25. The non-transitory machine-readable storage medium of claim 23,
  wherein the predetermined time for transmission of the PTI frame is defined by a PTI window interval, and wherein the PTI window interval is a duration between reception of a last buffered frame associated with a previous PTI frame and a transmission of a next PTI frame.

26. The non-transitory machine-readable storage medium of claim 25, wherein said instructions further comprise instructions to:
  determine whether a trigger time interval is elapsed, wherein the PTI window interval comprises one or more consecutive trigger time intervals; and
  if determined that the trigger time interval has elapsed,
    transmit the trigger frame from the first network device to the second network device; and
    restart the trigger time interval at the first network device.

27. The non-transitory machine-readable storage medium of claim 23, wherein the first network device is configured to operate in the power save operating mode, wherein the second network device is configured to operate in an active operating mode.

28. A non-transitory machine-readable storage medium having machine executable instructions stored therein, the machine executable instructions comprising instructions to:
  establish a direct wireless communication link between a first network device and a second network device of a communication network;
  receive from the second network device a notification that the second network device is entering power save operating mode;
  while the first network device and the second network device are in the power save operating mode receive, at the first network device, a peer traffic notification message from the second network device, wherein the peer traffic notification message indicates that the second network device has buffered a first buffered frame intended for the first network device;

determine that the first network device has buffered a second buffered frame intended for the second network device;

transmit the second buffered frame from the first network device to the second network device; and transmit a peer traffic response message to the second network device after transmitting the second buffered frame from the first network device to the second network device.

29. The non-transitory machine-readable storage medium of claim 28, wherein said instructions further comprise instructions to:

transmit the second buffered frame intended for the second network device and transmit the peer traffic response message to the second network device before a peer traffic response time interval elapses.

* * * * *